United States Patent
Holzer et al.

(10) Patent No.: US 10,147,211 B2
(45) Date of Patent: Dec. 4, 2018

(54) ARTIFICIALLY RENDERING IMAGES USING VIEWPOINT INTERPOLATION AND EXTRAPOLATION

(71) Applicant: Fyusion, Inc., San Francisco, CA (US)

(72) Inventors: Stefan Johannes Josef Holzer, San Mateo, CA (US); Stephen David Miller, San Francisco, CA (US); Martin Saelzle, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 227 days.

(21) Appl. No.: 14/800,642

(22) Filed: Jul. 15, 2015

(65) Prior Publication Data
US 2017/0018055 A1 Jan. 19, 2017

(51) Int. Cl.
*G09G 5/00* (2006.01)
*G06T 11/60* (2006.01)
*G06T 15/20* (2011.01)

(52) U.S. Cl.
CPC ............ *G06T 11/60* (2013.01); *G06T 15/205* (2013.01)

(58) Field of Classification Search
None
See application file for complete search history.

(56) References Cited

U.S. PATENT DOCUMENTS

| | | | |
|---|---|---|---|
| 5,613,048 A * | 3/1997 | Chen | ..................... G06T 15/205 345/419 |
| 5,926,190 A | 7/1999 | Turkowski et al. | |
| 6,252,974 B1 | 6/2001 | Martens et al. | |
| 6,504,569 B1 * | 1/2003 | Jasinschi | ................. G06T 7/246 345/950 |
| 7,167,180 B1 * | 1/2007 | Shibolet | ................... G06T 7/13 345/418 |
| 8,078,004 B2 | 12/2011 | Kang et al. | |
| 2002/0094125 A1 | 7/2002 | Guo | |

(Continued)

OTHER PUBLICATIONS

Fusiello et al., View Synthesis from Uncalibrated Images Using Parallax, 2003, IEEE Proceedings of the 12th International Conference on Image Analysis and Processing, pp. 146-151.*

(Continued)

*Primary Examiner* — Anh-Tuan V Nguyen
(74) *Attorney, Agent, or Firm* — Kwan & Olynick LLP

(57) ABSTRACT

Various embodiments of the present invention relate generally to systems and methods for artificially rendering images using viewpoint interpolation and extrapolation. According to particular embodiments, a method includes moving a set of control points perpendicular to a trajectory between a first frame and a second frame, where the first frame includes a first image captured from a first location and the second frame includes a second image captured from a second location. The set of control points is associated with a layer and each control point is moved based on an associated depth of the control point. The method also includes generating an artificially rendered image corresponding to a third location outside of the trajectory by extrapolating individual control points using the set of control points for the third location and extrapolating pixel locations using the individual control points.

18 Claims, 10 Drawing Sheets

(56) References Cited

U.S. PATENT DOCUMENTS

| | | | | |
|---|---|---|---|---|
| 2004/0222987 | A1* | 11/2004 | Chang | G01B 11/2509 345/419 |
| 2005/0232467 | A1* | 10/2005 | Mohri | G06F 3/0304 382/103 |
| 2005/0285874 | A1* | 12/2005 | Zitnick, III | G06T 15/205 345/592 |
| 2009/0263045 | A1 | 10/2009 | Szeliski et al. | |
| 2010/0188584 | A1* | 7/2010 | Liu | G06T 7/50 348/699 |
| 2011/0043604 | A1* | 2/2011 | Peleg | G06T 3/4038 348/36 |
| 2011/0141227 | A1* | 6/2011 | Bigioi | H04N 13/0007 348/36 |
| 2011/0170789 | A1* | 7/2011 | Amon | H04N 19/573 382/232 |
| 2011/0261050 | A1* | 10/2011 | Smolic | G06T 15/20 345/419 |
| 2012/0127172 | A1* | 5/2012 | Wu | G06T 15/205 345/419 |
| 2012/0127270 | A1* | 5/2012 | Zhang | G06T 7/0071 348/43 |
| 2012/0147224 | A1 | 6/2012 | Takayama | |
| 2012/0162223 | A1* | 6/2012 | Hirai | H04N 13/0007 345/419 |
| 2012/0301044 | A1* | 11/2012 | Nakada | H04N 5/2258 382/255 |
| 2013/0016897 | A1* | 1/2013 | Cho | H04N 13/0011 382/154 |
| 2013/0057644 | A1* | 3/2013 | Stefanoski | G06T 5/50 348/42 |
| 2013/0076619 | A1* | 3/2013 | Carr | G09G 5/00 345/156 |
| 2013/0162634 | A1* | 6/2013 | Baik | G06T 15/00 345/419 |
| 2013/0195350 | A1* | 8/2013 | Tanaka | H04N 13/0011 382/154 |
| 2013/0278596 | A1* | 10/2013 | Wu | G06T 15/00 345/419 |
| 2014/0049607 | A1* | 2/2014 | Amon | H04N 13/0048 348/43 |
| 2014/0063005 | A1* | 3/2014 | Ahn | H04N 13/026 345/419 |
| 2014/0078136 | A1* | 3/2014 | Sohn | G06T 15/205 345/419 |
| 2014/0087877 | A1 | 3/2014 | Krishnan | |
| 2014/0118494 | A1* | 5/2014 | Wu | G06T 7/20 348/44 |
| 2014/0192155 | A1* | 7/2014 | Choi | H04N 19/00769 348/43 |
| 2014/0211989 | A1* | 7/2014 | Ding | G06K 9/6211 382/103 |
| 2014/0253746 | A1* | 9/2014 | Voss | G06T 5/003 348/208.99 |
| 2014/0267616 | A1* | 9/2014 | Krig | H04N 13/0271 348/46 |
| 2014/0307045 | A1 | 10/2014 | Richardt et al. | |
| 2015/0130799 | A1 | 5/2015 | Holzer et al. | |
| 2015/0379763 | A1* | 12/2015 | Liktor | G06T 15/80 345/426 |
| 2017/0018056 | A1 | 1/2017 | Holzer et al. | |
| 2017/0084001 | A1 | 3/2017 | Holzer et al. | |

OTHER PUBLICATIONS

"U.S. Appl. No. 14/800,638, Non Final Office Action dated Jul. 29, 2016", 11 pages.

"International Application Serial No. PCT/US2016/042355, Search Report and Written Opinion dated Oct. 19, 2016", 9 pages.

"U.S. Appl. No. 14/800,638, Examiner Interview Summary dated May 9, 2017", 2 pages.

"U.S. Appl. No. 14/800,638, Examiner Interview Summary dated Nov. 7, 2016", 3 pages.

"U.S. Appl. No. 14/800,638, Final Office Action dated Jan. 20, 2017", 12 pages.

"U.S. Appl. No. 14/800,638, Non Final Office Action dated Jun. 15, 2017", 12 pgs.

"U.S. Appl. No. 14/800,638, Advisory Action dated May 9, 2017", 5 pgs.

* cited by examiner

US 10,147,211 B2

ARTIFICIALLY RENDERING IMAGES USING VIEWPOINT INTERPOLATION AND EXTRAPOLATION

TECHNICAL FIELD

The present disclosure relates to artificially rendering images using viewpoint interpolation and/or extrapolation.

DESCRIPTION OF RELATED ART

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing combined images, such as a panorama, or a three-dimensional (3D) image or model requires combining data from multiple images and can require interpolation or extrapolation of data. Most previously existing methods of interpolation or extrapolation require a significant amount of data in addition to the available image data. For those approaches, the additional data needs to describe the scene structure in a dense way, such as provided by a dense depth map (where for every pixel a depth value is stored) or an optical flow map (which stores for every pixel the motion vector between the available images). This limits the efficiency of these methods in processing speed as well as transfer rates when sending it over a network. Accordingly, improved mechanisms for interpolation and extrapolation are desirable.

Overview

Provided are various mechanisms and processes relating to artificially rendering images using viewpoint interpolation and extrapolation.

In one aspect, which may include at least a portion of the subject matter of any of the preceding and/or following examples and aspects, a method includes moving a set of control points perpendicular to a trajectory between a first frame and a second frame, where the first frame includes a first image captured from a first location and the second frame includes a second image captured from a second location. The set of control points is associated with a layer and each control point is moved based on an associated depth of the control point. The method also includes generating an artificially rendered image corresponding to a third location outside of the trajectory by extrapolating individual control points using the set of control points for the third location and extrapolating pixel locations using the individual control points.

In another aspect, which may include at least a portion of the subject matter of any of the preceding and/or following examples and aspects, a computer readable medium includes computer code for moving a set of control points perpendicular to a trajectory between a first frame and a second frame, where the first frame includes a first image captured from a first location and the second frame includes a second image captured from a second location. The set of control points is associated with a layer and each control point is moved based on an associated depth of the control point. The computer readable medium also includes code for generating an artificially rendered image corresponding to a third location outside of the trajectory by extrapolating individual control points using the set of control points for the third location and extrapolating pixel locations using the individual control points.

In yet another aspect, which may include at least a portion of the subject matter of any of the preceding and/or following examples and aspects, an apparatus includes means for moving a set of control points perpendicular to a trajectory between a first frame and a second frame, where the first frame includes a first image captured from a first location and the second frame includes a second image captured from a second location. The set of control points is associated with a layer and each control point is moved based on an associated depth of the control point. The apparatus also includes means for generating an artificially rendered image corresponding to a third location outside of the trajectory by extrapolating individual control points using the set of control points for the third location and extrapolating pixel locations using the individual control points.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
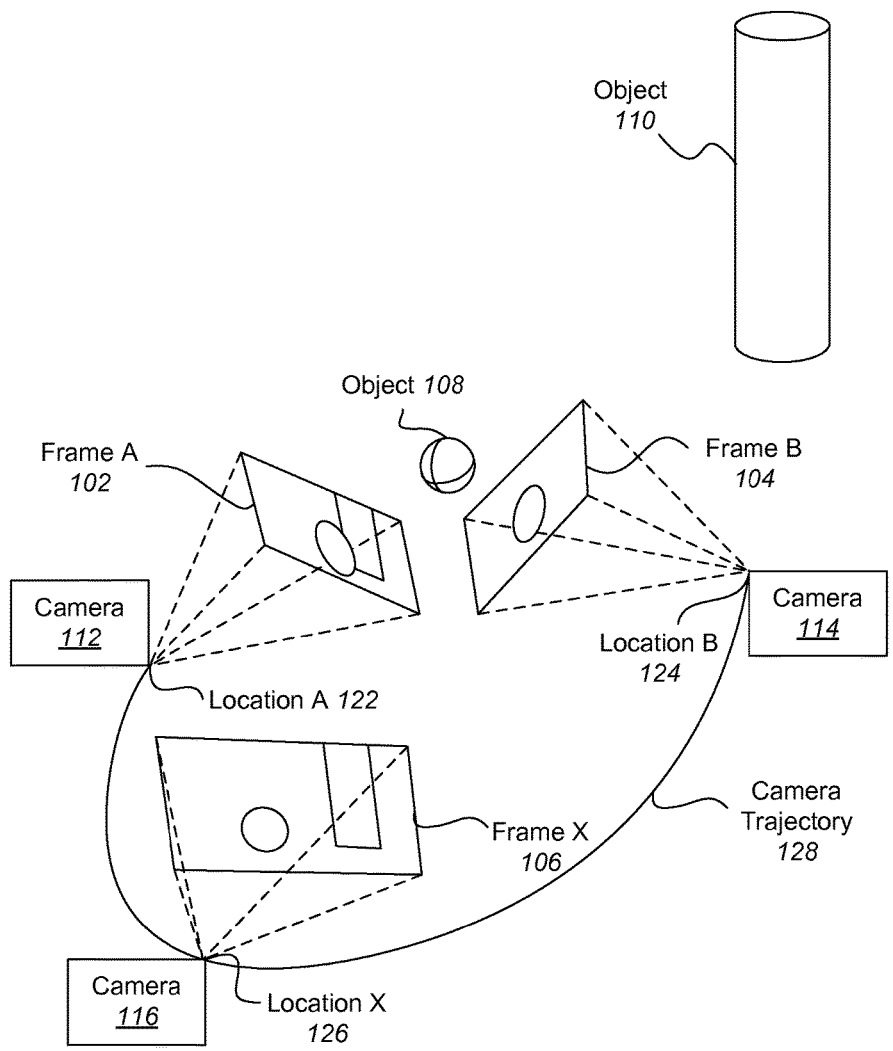
FIG. 1 illustrates an example of a configuration where an artificially rendered image is generated for a chosen viewpoint on a trajectory between two frames.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various systems and methods for analyzing the spatial relationship between multiple images and video together with location information data, for the purpose of creating a single representation, a surround view, which eliminates redundancy in the data, and presents a user with an interactive and immersive active viewing experience, is described in U.S. patent application Ser. No. 14/530,669 by Holzer et al., filed on Oct. 31, 2014, titled "Analysis and Manipulation of Images and Video for Generation of Surround Views," which is incorporated by reference herein in its entirety and for all purposes. According to various embodiments described therein, a surround view provides a user with the ability to control the viewpoint of the visual information displayed on a screen.

According to various embodiments, a surround view is a multi-view interactive digital media representation. The data used to generate a surround view can come from a variety of sources. In particular, data such as, but not limited to, two-dimensional (2D) images can be used to generate a surround view. These 2D images can include color image data streams such as multiple image sequences, video data, etc., or multiple images in any of various formats for images, depending on the application. Another source of data that can be used to generate a surround view includes location information. This location information can be obtained from sources such as accelerometers, gyroscopes, magnetometers, GPS, WiFi, IMU-like systems (Inertial Measurement Unit systems), and the like. Yet another source of data that can be used to generate a surround view can include depth images. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together. In some embodiments, a surround view can be generated by a combination of data that includes both 2D images and location information, without any depth images provided. In other embodiments, depth images and location information can be used together. Various combinations of image data can be used with location information, depending on the application and available data.

In the present example embodiment, the data that has been fused together is then used for content modeling and context modeling. According to various examples, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. In various embodiments, the models provided by content modeling and context modeling can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target can be chosen. It should be noted, however, that a surround view can be generated without a user specified target in some applications.

In the present example embodiment, one or more enhancement algorithms can be applied. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In the present embodiment, a surround view is generated after any enhancement algorithms are applied. The surround view can provide a multi-view interactive digital media representation. In various examples, the surround view can include a three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

As described above, view interpolation can be used to improve the viewing experience. In particular, to avoid sudden "jumps" between stabilized frames, synthetic, intermediate views can be rendered during acquisition or generation of a surround view. However, according to various embodiments, only a limited amount of image frames are stored for each surround view for storage efficiency. In some examples, the selection of these frames is based on the motion of the camera rather than on time. For instance, a new frame is sampled only if the camera moved sufficiently with respect to the previously sampled frame. Consequently, in order to provide a smooth viewing experience for a user interacting with a surround view, artificially rendered frames must be generated. These artificially rendered frames serve to close the gap between two sampled frames that would otherwise appear to have a "jump" between them. Accordingly, by generating these artificially rendered frames, smooth navigation within the surround view becomes possible.

Various embodiments described below include methods of viewpoint interpolation and extrapolation that can be used to generate artificially rendered frames. In various examples, interpolation between frames is performed along a path between the frames. In some instances, this path can follow a non-linear trajectory. In addition, various described extrapolation methods allow the artificially rendered frame to represent a view from a location that is not on the trajectory of the recording camera or in between two sampled frames. By providing interpolation and extrapolation methods for paths between or beyond the originally provided frames, various artificially rendered views can be provided for a surround view.

With reference to FIG. 1, shown is an example of a configuration where an artificially rendered image is generated for a viewpoint at Location X on a trajectory between Location A and Location B. In this example, a single transform for viewpoint interpolation is used along the trajectory between two frames, Frame A 102 and Frame B 104. As shown, Frame A 102 represents an image captured of objects 108 and 110 by a camera 112 located at Location A 122. Frame B 104 represents an image captured of object 108 by a camera 114 located at Location B 124. In the present example, the transformation (T_AB) is estimated between the two frames, where T_AB maps a pixel from frame A to frame B. This transformation is performed using methods such as homography, affine, similarity, translation, rotation, or scale.

In the present example, an artificially rendered image at Location X 126, which can also be denoted as a viewpoint position at x \in [0, 1] on the trajectory between frame A and B, where frame A is located at 0 and frame B at 1, is then generated by interpolating the transformation, gathering image information from Frames A and B, and combining the image information. In the present example, the transformation is interpolated (T_AX and T_XB). One way to interpolate this transformation is to parameterize the transformation T_AB and linearly interpolate those parameters. However, this interpolation is not limited to linear interpolations and other methods can be used within the scope of this disclosure. Next, image information is gathered from both Frames A and B by transferring image information from Frame A 102 to Frame X 106 based on T_AX and by transferring image information from Frame B 104 to Frame X 106 based on T_XB. Finally, the image information gathered from both Frames A and B is combined to generate an artificially rendered image at Location X 126.

Figure 2:
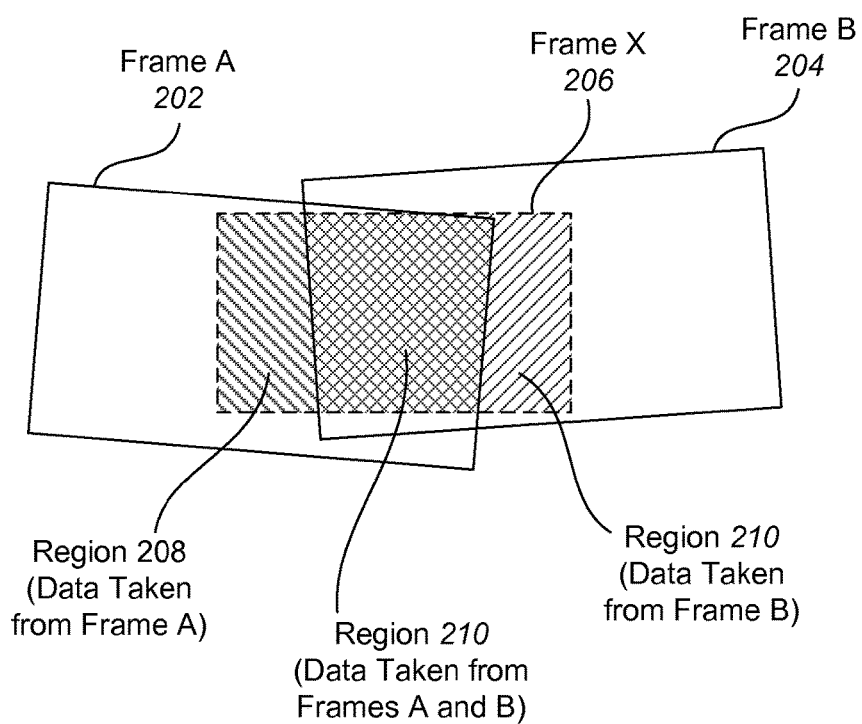
FIG. 2 illustrates an example of combining image information gathered from two frames to artificially render an image for another frame using weighted image information.

In the present example, combining the image information gathered from both Frames A and B can be done in various ways. With reference to FIG. 2, shown is one example of a way to combine image information gathered from both Frames A and B to artificially render an image in Frame X using weighted image information. As shown, image information is taken from Frame A 202 and Frame B 204 to generate an image in Frame X 206. Image information in Region 208 of Frame X 206 is taken from Frame A. Image information in Region 210 of Frame X 206 is taken from Frame B. Image information in Region 210 of Frame X 206 includes information from both Frame A 202 and Frame B 204. In order to account for the overlap in information, the image information is weighted. Specifically, the information is combined using the image information from Frame A 202 using 1-x and the image information from Frame B 204 using x.

Figure 3:
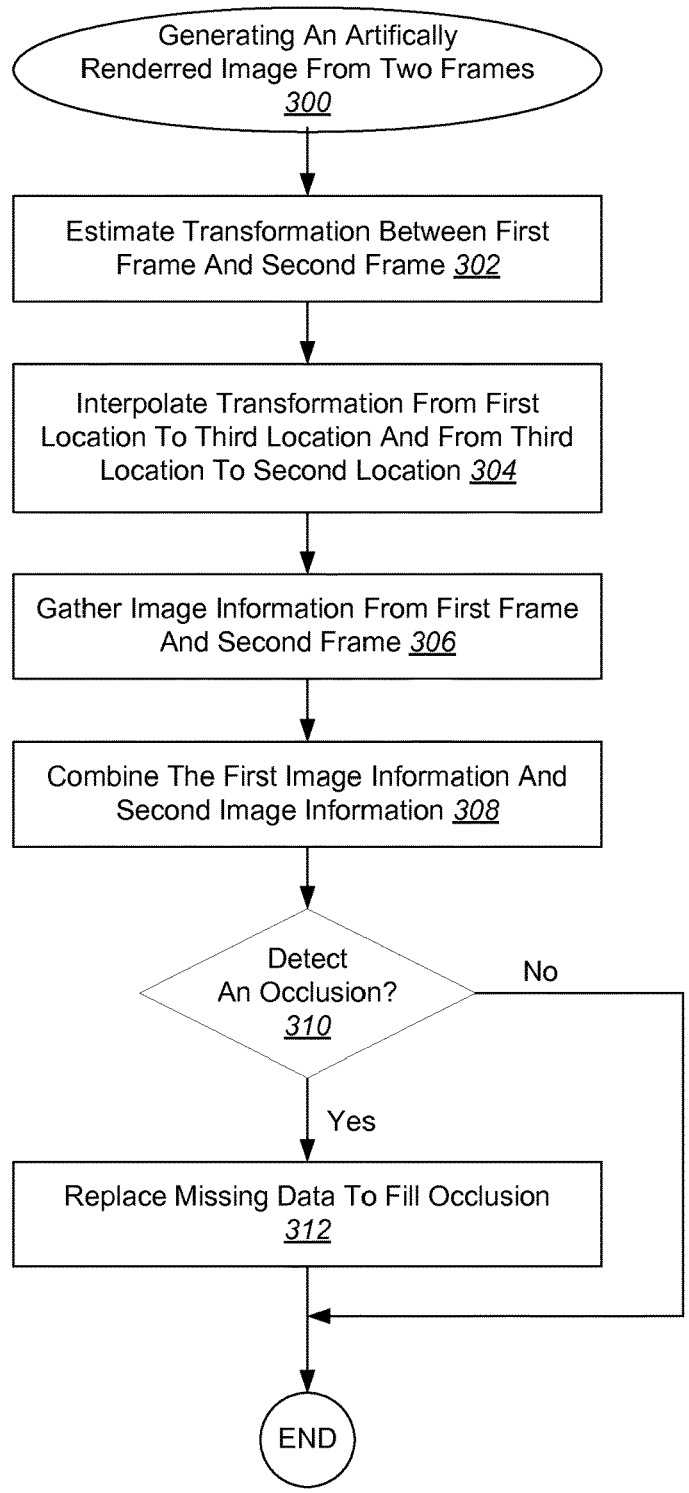
FIG. 3 illustrates an example of a process for generating an artificially rendered image from two frames.

With reference to FIG. 3, shown is an example of a process for generating an artificially rendered image from two frames 300. In this example, a transformation is estimated between a first frame and a second frame at 302. The transformation is estimated using methods such as homography, affine, similarity, translation, rotation, or scale. As described above with regard to FIG. 1, the first frame includes a first image captured from a first location (Location A 122) and the second frame includes a second image captured from a second location (Location B 124). In some examples, the first image and second image are associated with the same layer. Next, an artificially rendered image is rendered corresponding to a third location. This third location is positioned on a trajectory between the first location and the second location, as shown as Location X 126 in FIG. 1.

The artificially rendered image is generated in a number of steps. First, a transformation is interpolated from the first location to the third location and from the third location to the second location at 304. In some instances, interpolating the transformation includes parameterizing the transformation from the first location to the third location and from the third location to the second location. Furthermore, in some examples, the parameterized transformation is then linearly interpolated.

Next, image information is gathered from the first frame and the second frame at 306 by transferring first image information from the first frame to the third frame based on the interpolated transformation and second image information from the second frame to the third frame based on the interpolated transformation. Finally, the first image information and the second image information is combined to yield the artificially rendered image. In some examples, combining the first image information and the second image information includes weighting the first image information from the first frame and the second image information from the second frame.

According to various embodiments, the process can end with combining the first image information and second image information at 308. However, according to the present example, the process shown continues with determining whether an occlusion is present in the artificially rendered image at 310. Such an occlusion is created by a change in layer placement between the first frame and second frame. Specifically, the first image and second image may include foregrounds and backgrounds that include one or more layers, each layer corresponding to a region of image pixels that share a similar motion, as described in more detail below with regard to FIG. 4. These layers can move relative to each other. In some cases, the layers may move in a manner causing an occlusion in a combined image. If an occlusion is detected, then the missing data is replaced to fill the first occlusion at 310. In some instances, the missing data is obtained by interpolation or extrapolation. In other instances, the missing data is obtained from the first frame or the second frame. In yet other instances, the missing data is obtained from another frame (separate from the first and second frame) that includes image information corresponding to the missing data. In another example, the missing data is obtained by extrapolating from surrounding image data. This surrounding image data includes information from frames located near the first location and second location.

Figure 4:
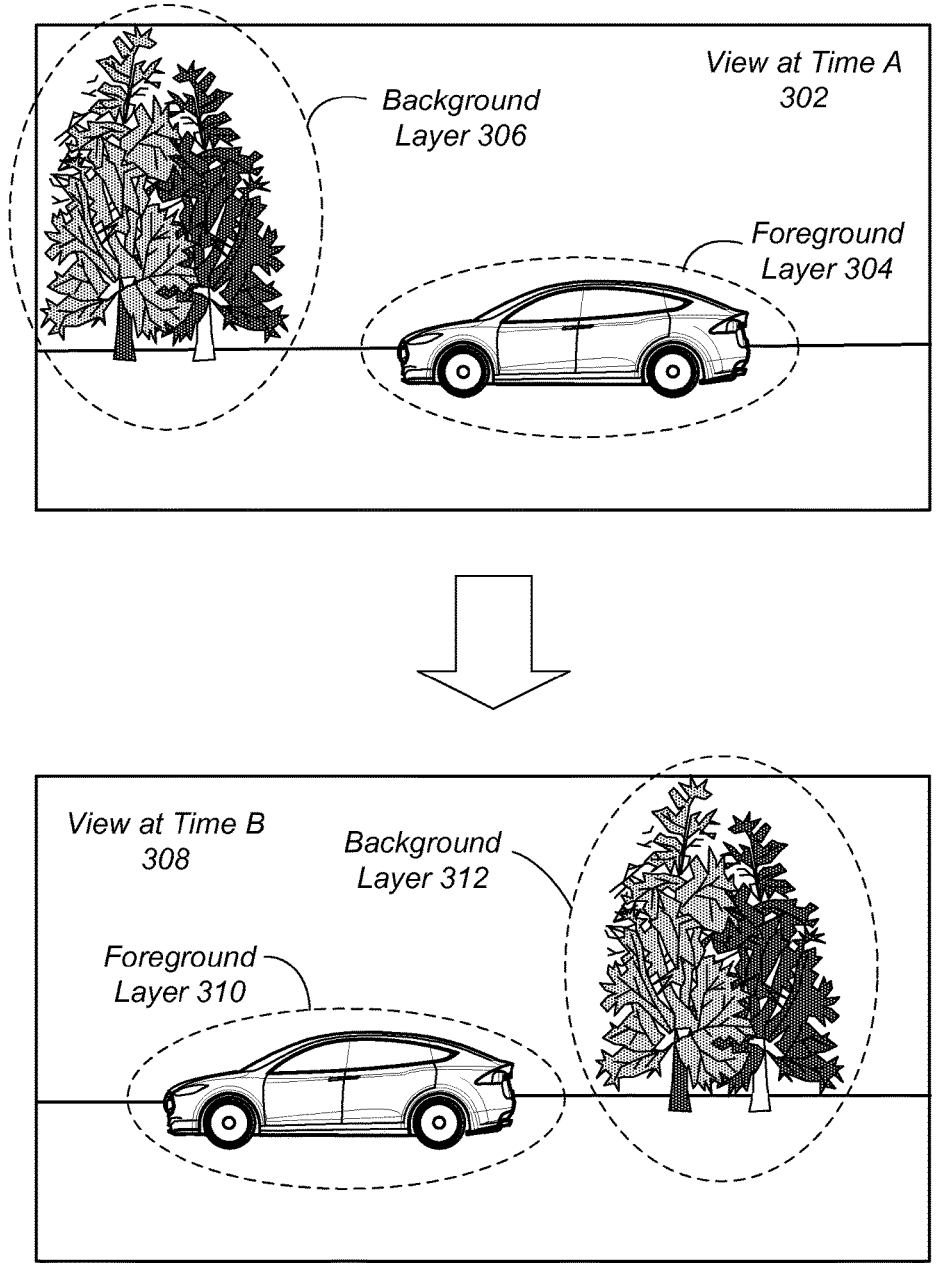
FIG. 4 illustrates an example of combining image information gathered from two frames to artificially render an image in another frame using multiple layers extracted from surround views.

With reference to FIG. 4, shown is an example of combining image information gathered from both Frames A and B to artificially render an image in Frame X by using multiple layers of an image. The present example uses the method described above with regard to FIG. 3, where the first frame and second frame are made up of two or more layers. In particular, the first frame, which includes a view at Time A 302, includes a background layer 306 and foreground layer 304. The second frame, which includes a view at Time B 308, includes a background layer 312 and foreground layer 310. In some examples, foreground and/or background can include one or more layer. In the present example, a layer is a region of image pixels that share a similar motion, based on factors such as depth and or speed of the corresponding real world object.

In the present example, viewpoint-interpolation can be used to generate an artificially rendered image as described above with regard to FIG. 3. In addition, because different motions of the layers can create occlusions and/or regions with missing data, the process can also include methods for filling the regions corresponding to any detected occlusions. Whether data is occluded or missing is based on the ordering of layers. Although the layers are expected to stay in the same order, they can switch order if the objects change their depth location within the scene. For instance, occlusions are created if a first layer moves in front of a second layer, where the first layer is closer to the camera than second layer. In the case that the first layer is non-see-through, image information from the first layer is taken wherever the first and second layer overlap. In the case that the first layer is partially see-through, image information is taken from both layers according to the opacity of the first layer. This process can also be extended to more than two layers.

As described above with regard to FIG. 3, missing information can be obtained in various ways, including interpolation or extrapolation. For instance, missing data can be taken from only one of the frames, depending on which frame includes a view of the missing data. In another example, the missing data can be taken from other frames where this region is visible. For instance, in a surround view that includes various frames and viewpoints, other frames can be used to fill in this missing data. In another example, the missing data can be extrapolated from surrounding image data, to create artificial image data that estimates what the missing data would look like. In yet another example, viewpoint-extrapolation using multiple layers can be applied outside of the trajectory between the two frames, by moving the different layers in perpendicular motion to the trajectory motion, as shown in more detail with regard to FIG. 6. According to various examples, the transform between the two frames can be an image transformation or a 3D transformation. An image transformation can use methods such as homography, affine, similarity, translation, rotation, scale. For a 3D transformation, layers are moved with respect to their depth and the 3D transformation, according to various embodiments.

Figure 5A:
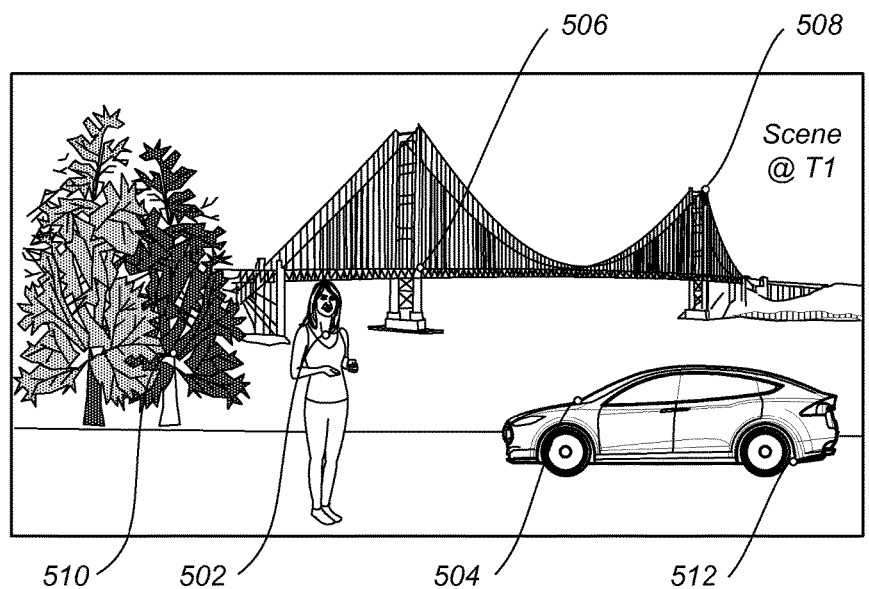
FIGS. 5A-5B illustrate an example of an image transformation between two frames using tracked control points between the two frames.
Figure 5B:
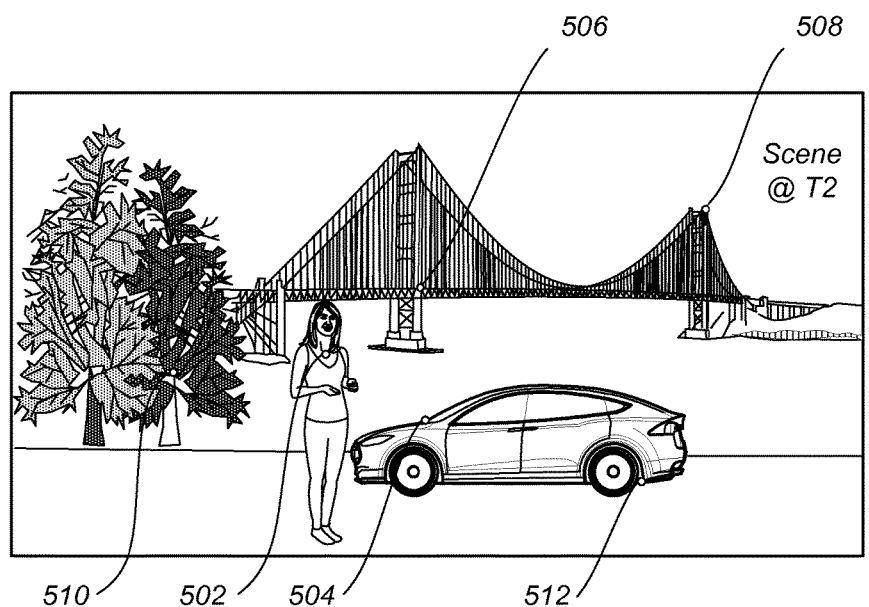

With reference to FIGS. 5A-5B, shown is an example of an image transformation between two frames using tracked control points between the two frames. In particular, FIG. 5A shows a first frame of a scene at a first time T1 and FIG. 5B shows a second frame of the scene at a second time T2. A set of control points 502, 504, 506, 508, 510, and 512 are tracked between the two frames, such that their locations are known in both frames. An intermediate frame X at x \in [0, 1] between these two frames can be generated by interpolating the location of all control points individually for x and then computing the image data for frame X by interpolating all pixel locations using those control points. In some examples, the set of control points are located within a single layer that includes particular objects viewable in the first frame and second frame. In this case, generating an artificially rendered image may include interpolating image data for multiple layers and combining these layers. In other example, each pixel in the first frame corresponds to a control point in the set of control points. Accordingly, each pixel is tracked and interpolated in that instance.

In the present embodiment, an artificially rendered image is generated as intermediate frame X by tracking a set of control points between the first frame and the second frame, and interpolating individual control points for the third location X using the set of control points and interpolating pixel locations using the individual control points. As shown, the first frame includes a first image captured from a first location and the second frame includes a second image captured from a second location. In one example, interpolating the pixel locations includes interpolation using barycentric coordinates based on three or more control points. In another example, interpolating the pixel locations includes interpolation using splines. In yet another example, interpolating the pixel locations includes interpolation using finite elements. In yet another example, interpolating the pixel locations includes using motion of the nearest control point. In some examples, interpolating pixel locations using the individual control points includes using dense optical flow. In other examples, interpolating pixel locations using the individual control points includes using depth data.

Figure 6:
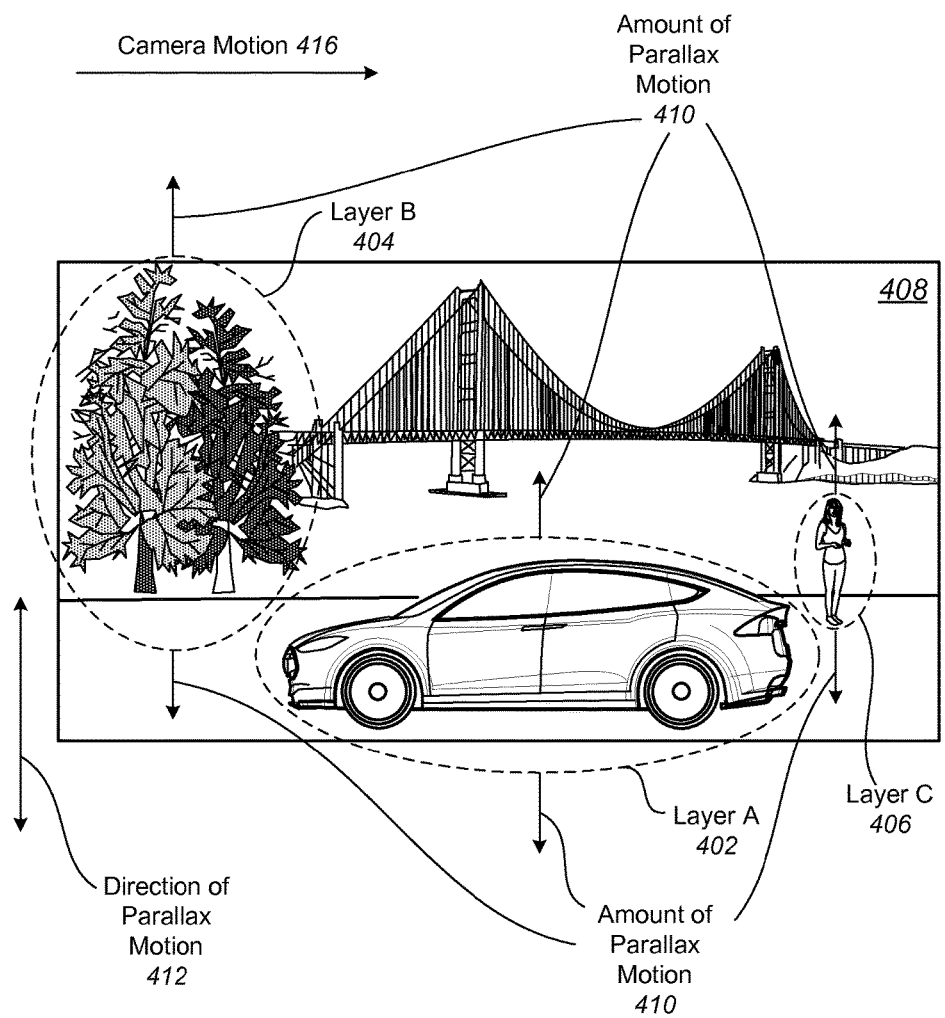
FIG. 6 illustrates an example of viewpoint extrapolation outside of the trajectory between two frames using multiple layers and the parallax effect.

With reference to FIG. 6, shown is an example of viewpoint extrapolation outside of the trajectory between two frames using multiple layers and the parallax effect. Using multiple layers, viewpoint-extrapolation outside of a trajectory between two frames can be achieved by moving the different layers in perpendicular motion to the trajectory motion. As shown, a scene 408 includes multiple layers Layer A 402, Layer B 404, and Layer C 406. Although not shown, two frames capturing images of the scene 408 can be obtained by moving a camera along camera motion 416. Comparing the two images will show parallax motion in the direction 412. As shown in the figure, the amount of parallax motion 410 of each of the layers can indicate movement or differences between the frames. Although not indicated in the figure, the different layers 402, 404, and 406 can each have different amounts of parallax motion.

In the present embodiment an artificially rendered image is generated using this parallax effect. In particular, a set of control points (not shown) is moved perpendicular to a trajectory between a first frame and a second frame. In this example, the first frame includes a first image captured from a first location and the second frame includes a second image captured from a second location and each control point is moved based on an associated depth of the control point. Specifically, control points located at a further depth are moved less than control points at a closer depth in some examples. Additionally, in some applications, each pixel in the first image corresponds to a control point in the set of control points. Furthermore, in addition to having a concrete depth associated with a point, it is also possible to infer the depth from the amount of frame-to-frame motion of the control points.

Next, an artificially rendered image corresponding to a third location outside of the trajectory is generated by extrapolating individual control points using the set of control points for the third location and extrapolating pixel locations using the individual control points. In some examples, extrapolating the pixel locations includes extrapolation using barycentric coordinates based on three or more control points. In other examples, extrapolating the pixel locations includes extrapolation using splines. In yet other examples, extrapolating the pixel locations includes extrapolation using finite elements. In other instances, extrapolating the pixel locations includes using motion of a nearest control point. In yet other instances, extrapolating pixel locations using the individual control points includes using dense optical flow.

Figure 7:
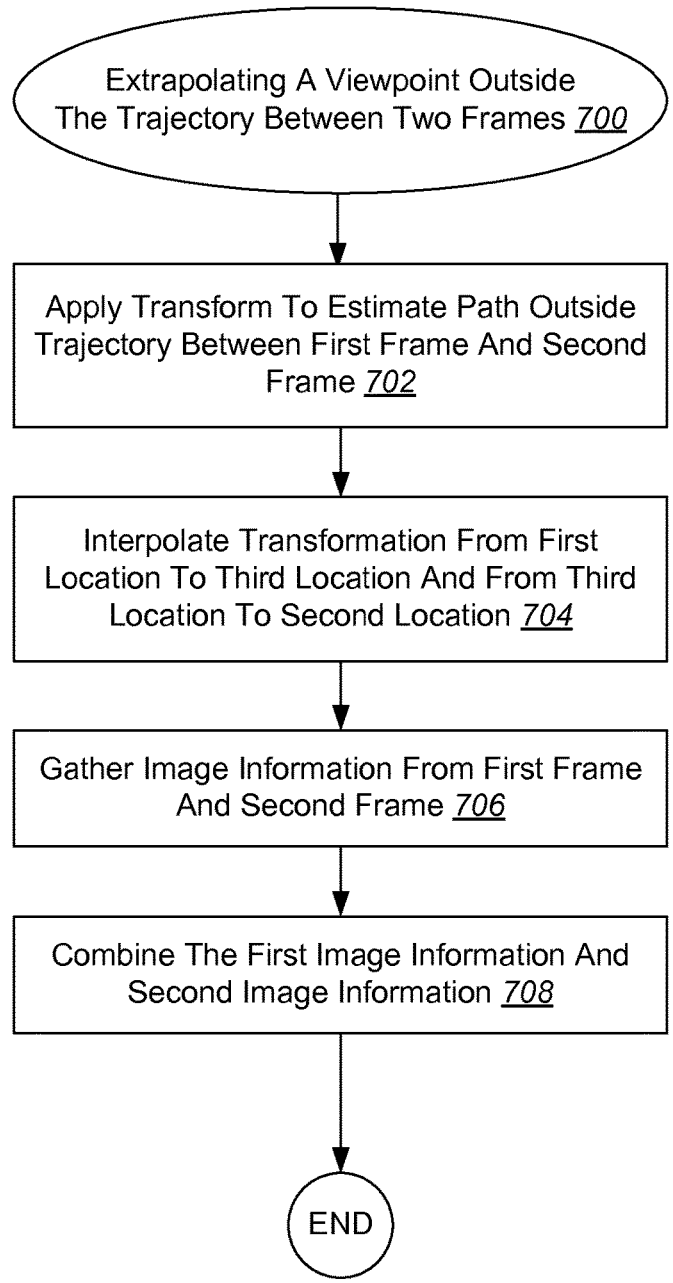
FIG. 7 illustrates an example of a process for extrapolating a viewpoint outside the trajectory between two frames.

With reference to FIG. 7, shown is an example of a process for extrapolating a viewpoint outside the trajectory between two frames. This process can be viewed as an extension to the process described with regard to FIG. 3, where viewpoints for locations outside of the trajectory between Frame A and Frame B are extrapolated by applying a transform which warps the image according the curvature and direction of the estimated path.

In the present embodiment, a transform is applied to estimate a path outside the trajectory between a first frame and a second frame at 702. The first frame includes a first image captured from a first location and the second frame includes a second image captured from a second location. In some examples, the first image and second image are associated with the same layer. Furthermore, this process can be applied to various layers and the resulting images representing the layers can be combined to generate a complete image. Next, an artificially rendered image corresponding to a third location positioned on the path is generated. The artificially rendered image is generated by first interpolating a transformation from the first location to the third location and from the third location to the second location at 704. Image information is then gathered from the first frame and the second frame at 706 by transferring first image information from the first frame to the third frame based on the interpolated transformation and second image information from the second frame to the third frame based on the interpolated transformation. Finally, the first image information and the second image information is combined at 708.

According to present embodiment, the transform can implement various features. For instance, the transform can implement features such as homography, spherical projection, and/or cylindrical projection. These features can be used alone or in conjunction with one another in applying the transform. Additional features not mentioned can also be implemented within the scope of this disclosure.

The present embodiment describes one method of extrapolating a viewpoint outside the trajectory between two frames. However, additional methods for extrapolating such viewpoints can also be implemented in other embodiments. For instance, as described above with regard to FIG. 6, another way to extrapolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result.

Figure 8:
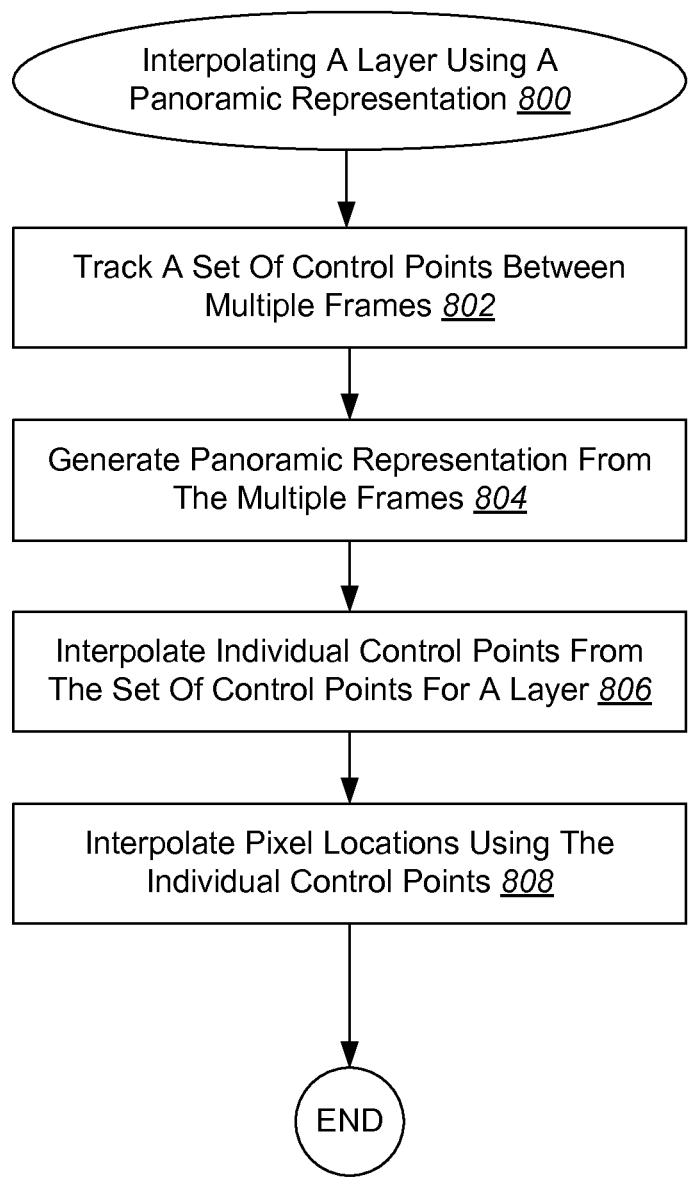
FIG. 8 illustrates an example of a process for interpolating a layer using a panoramic representation.

With reference to FIG. 8, shown is an example of a process for interpolating a layer using a panoramic representation. In this example, the span of a layer is not restricted to two frames but is constructed from multiple frames. Specifically, a panorama is created from the corresponding background regions and combined into a panoramic representation. This panorama representation is then used to interpolate the corresponding layer. Although this process is described in terms of a background layer, this process can also be extended to other types of layers. For instance, the process can be applied to layers that include objects, such as context layers.

In the present embodiment, a set of control points is tracked between multiple frames associated with the same layer at 802. In some examples, each pixel corresponds to a control point in the set of control points. In these cases, each pixel is then interpolated based on the set of control points for the artificially rendered image. Next, a panoramic representation is generated from the multiple frames at 804. Individual control points are then interpolated from the set of control points at 806 for a desired frame or layer. Pixel locations are then interpolated for this frame or layer using the individual control points at 808. From this interpolation, the artificially rendered image/layer is generated.

According to various embodiments, interpolation can be implemented using a variety of methods. For instance, interpolating the pixel locations can include interpolation using barycentric coordinates based on three or more control points. In some examples, interpolating the pixel locations includes interpolation using splines. In other examples, interpolating the pixel locations includes interpolation using finite elements. In yet other examples, interpolating the pixel locations includes using motion of a nearest control point. In addition, interpolating pixel locations using the individual control points includes using dense optical flow in some applications. Although particular examples of interpolation methods are described, any combination of these or other methods can be used.

Figure 9:
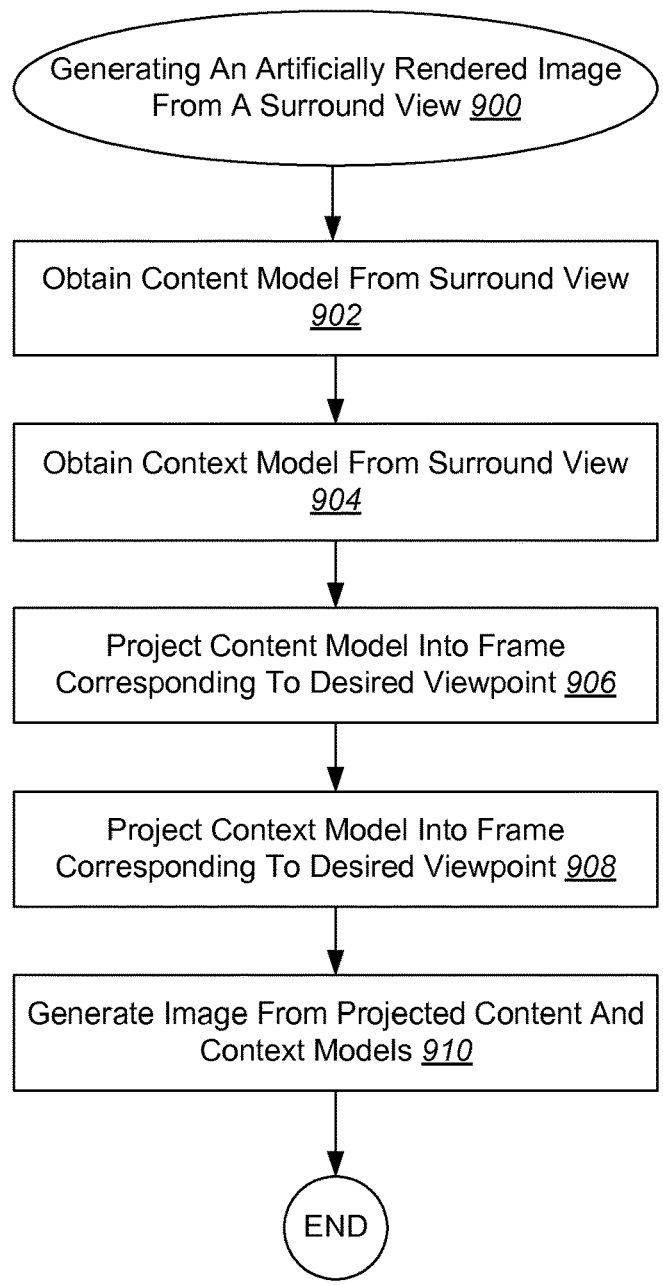
FIG. 9 illustrates an example of a process for generating an artificially rendered image from a surround view.

With reference to FIG. 9, shown is an example of a process for generating an artificially rendered image from a surround view. As described previously, a surround view is a multi-view interactive digital media representation. In some examples, the surround view is generated from multiple images having location information, and at least a portion of overlapping subject matter. Furthermore, according to various embodiments, the surround view is generated by interpolating between the multiple images and/or extrapolating data from the multiple images. In the present example, a surround view can be decomposed into one or more background panoramic representations and, in some examples, one or more foreground 3D models. An image at a specific viewpoint is then rendered by projecting the 3D model(s) and the panoramic representation(s) into a frame according to the current viewpoint and the depth and orientation of the 3D model(s).

In the present embodiment, a content model is obtained from a surround view at 902. This content model is a foreground three-dimensional model including at least one object. In some examples, obtaining the content model from the surround view includes extracting the content model from the surround view. At 904, a context model is obtained from the surround view. This context model is a background panoramic representation including scenery surrounding any objects in the content model. In some examples, obtaining the context model from the surround view includes extracting the context model from the surround view. Next, the content model is projected into a frame corresponding to a desired viewpoint at 906. The context model is also projected into the frame corresponding to the desired viewpoint at 908. According to various embodiments, the content model and context model are projected according to the depth and orientation of the content model. The artificially rendered image at the desired viewpoint is generated from a combination of the projected content and context at at 910.

Various examples of viewpoint interpolation and extrapolation are described in the present disclosure. According to various embodiments, one or a combination of methods can be used to generate a single artificially rendered image. For instance, one layer can be handled using the method described with regard to FIG. 3, another layer can be handled using the method described with regard to FIGS. 5A-5B, and a background layer can be handled using the method described with regard to FIG. 8. Any combination of methods can be used within the scope of this disclosure. Additionally, any one method can be used alone to generate an artificially rendered image.

The methods presented in this disclosure are highly efficient and can be run on a mobile platform in real-time. The various methods require only very small amounts of additional data and are therefore extremely well-suited for data that needs to be sent over a wireless network (e.g. LTE). In addition, the methods are sufficiently regularized to handle problematic cases without creating jarring artifacts. Accordingly, the methods described herein are suitable for generating artificially rendered images on mobile devices, etc.

Figure 10:
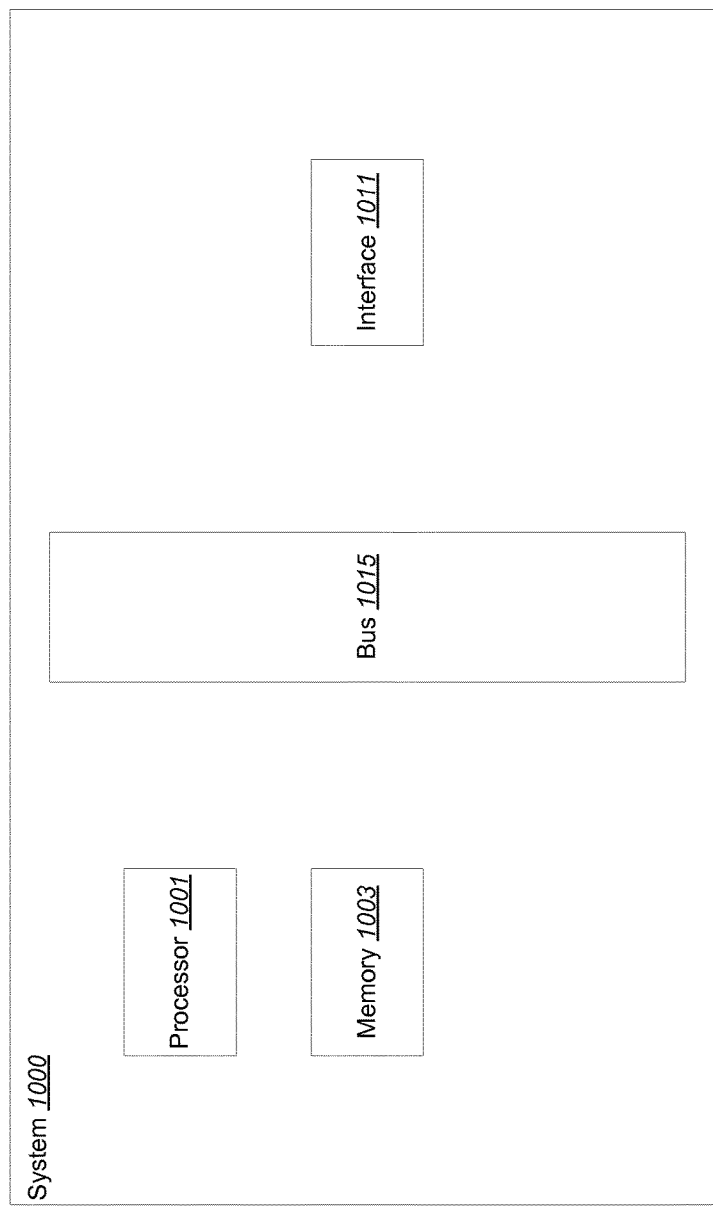
FIG. 10 illustrates a particular example of a computer system that can be used with various embodiments of the present invention.

Various computing devices can implement the methods described. For instance, a mobile device, computer system, etc. can be used to generate artificially rendered images. With reference to FIG. 10, shown is a particular example of a computer system that can be used to implement particular examples of the present invention. For instance, the computer system 1000 can be used to provide generate artificially rendered images according to various embodiments described above. In addition, the computer system 1000 shown can represent a computing system on a mobile device. According to particular example embodiments, a system 1000 suitable for implementing particular embodiments of the present invention includes a processor 1001, a memory 1003, an interface 1011, and a bus 1015 (e.g., a PCI bus). The interface 1011 may include separate input and output interfaces, or may be a unified interface supporting both operations. When acting under the control of appropriate software or firmware, the processor 1001 is responsible for such tasks such as optimization. Various specially configured devices can also be used in place of a processor 1001 or in addition to processor 1001. The complete implementation can also be done in custom hardware. The interface 1011 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1000 uses memory 1003 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    moving a mobile device with a camera through space in a locally convex or locally concave motion;
    obtaining, from the camera throughout the movement of the mobile device, a plurality of frames having location information obtained from Inertial Measuring Unit (IMU) information and depth information, wherein the plurality of frames include a first frame and a second frame;
    moving a set of control points perpendicular to a trajectory between the first frame and the second frame, wherein the first frame includes a first image captured using the camera from a first location and the second frame includes a second image captured using the camera from a second location, wherein each control point is moved based on an associated depth of the control point, the depth of each of the control points being determined from the amount of frame-to-frame motion of the control points between the first frame and the second frame, wherein control points located at a further depth are moved less than control points located at a closer depth, wherein the set of control points is associated with a single layer among multiple layers;

generating an artificially rendered image corresponding to a third location outside of the trajectory by extrapolating individual control points using the set of control points for the third location and extrapolating pixel locations using the individual control points, wherein generating the artificially rendered image occurs on the fly based on content-weighted keypoint tracks between the first image and the second image, the IMU information, and the depth information; and generating a surround view by fusing the plurality of frames along with the artificially rendered image, wherein the surround view is a three-dimensional multi-view interactive digital media representation (MIDMR) created from two-dimensional images in the plurality of frames and the artificially rendered image.

2. The method of claim 1, wherein extrapolating the pixel locations includes extrapolation using barycentric coordinates based on three or more control points.

3. The method of claim 1, wherein extrapolating the pixel locations includes extrapolation using splines.

4. The method of claim 1, wherein extrapolating the pixel locations includes extrapolation using finite elements.

5. The method of claim 1, wherein extrapolating the pixel locations includes using motion of a nearest control point.

6. The method of claim 1, wherein extrapolating pixel locations using the individual control points includes using dense optical flow.

7. The method of claim 1, wherein extrapolating pixel locations using the individual control points includes using depth data.

8. The method of claim 1, wherein each pixel in the first image corresponds to a control point in the set of control points.

9. A non-transitory computer readable medium comprising:

computer code for obtaining, from the camera throughout the movement of the mobile device, a plurality of frames having location information obtained from Inertial Measuring Unit (IMU) information and depth information, wherein the plurality of frames include a first frame and a second frame;

computer code for moving a set of control points perpendicular to a trajectory between the first frame and the second frame, wherein the first frame includes a first image captured using the camera from a first location and the second frame includes a second image captured using the camera from a second location, wherein each control point is moved based on an associated depth of the control point, the depth of each of the control points being determined from the amount of frame-to-frame motion of the control points between the first frame and the second frame, wherein control points located at a further depth are moved less than control points located at a closer depth, wherein the set of control points is associated with a single layer among multiple layers;

computer code for generating an artificially rendered image corresponding to a third location outside of the trajectory by extrapolating individual control points using the set of control points for the third location and extrapolating pixel locations using the individual control points, wherein generating the artificially rendered image occurs on the fly based on content-weighted keypoint tracks between the first image and the second image, the IMU information, and the depth information; and computer code for generating a surround view by fusing the plurality of frames along with the artificially rendered image, wherein the surround view is a three-dimensional multi-view interactive digital media representation (MIDMR) created from two-dimensional images in the plurality of frames and the artificially rendered image.

10. The computer readable medium of claim 9, wherein extrapolating the pixel locations includes extrapolation using barycentric coordinates based on three or more control points, extrapolation using splines, or extrapolation using finite elements.

11. The computer readable medium of claim 9, wherein extrapolating the pixel locations includes using motion of a nearest control point.

12. The computer readable medium of claim 9, wherein each pixel in the first image corresponds to a control point in the set of control points.

13. The computer readable medium of claim 12, wherein extrapolating pixel locations using the individual control points includes using dense optical flow.

14. The computer readable medium of claim 12, wherein extrapolating pixel locations using the individual control points includes using depth data.

15. A system comprising:
a camera;
a processor; and
memory, wherein the memory stores instructions for:
obtaining, from the camera throughout the movement of the mobile device, a plurality of frames having location information obtained from Inertial Measuring Unit (IMU) information and depth information, wherein the plurality of frames include a first frame and a second frame;

moving a set of control points perpendicular to a trajectory between the first frame and the second frame, wherein the first frame includes a first image captured using the camera from a first location and the second frame includes a second image captured using the camera from a second location wherein each control point is moved based on an associated depth of the control point, the depth of each of the control points being determined from the amount of frame-to-frame motion of the control points between the first frame and the second frame, wherein control points located at a further depth are moved less than control points located at a closer depth, wherein the set of control points is associated with a single layer among multiple layers;

generating an artificially rendered image corresponding to a third location outside of the trajectory by extrapolating individual control points using the set of control points for the third location and extrapolating pixel locations using the individual control points, wherein generating the artificially rendered image occurs on the fly based on content-weighted keypoint tracks between the first image and the second image, the IMU information, and the depth information; and generating a surround view by fusing the plurality of frames along with the artificially rendered image, wherein the surround view is a three-dimensional multi-view interactive digital media representation (MIDMR) created from two-dimensional images in the plurality of frames and the artificially rendered image.

16. The apparatus of claim 15, wherein extrapolating the pixel locations includes extrapolation using barycentric coordinates based on three or more control points, extrapolation using splines, or extrapolation using finite elements.

17. The apparatus of claim 15, wherein extrapolating the pixel locations includes using motion of a nearest control point.

18. The apparatus of claim 15, wherein each pixel in the first image corresponds to a control point in the set of control points.

\* \* \* \* \*